Jan. 28, 1975 D. J. BALDWIN Re. 28,320

CLEANING OF THE INTERIOR OF STORAGE TANKS

Original Filed July 27, 1970 2 Sheets-Sheet 1

INVENTOR
DAVID JOHN BALDWIN
Theodore B. Roesel
ATTORNEYS

CLEANING OF THE INTERIOR OF STORAGE TANKS

Original Filed July 27, 1970 2 Sheets-Sheet 2

INVENTOR
DAVID JOHN BALDWIN
Theodore B. Roesel
ATTORNEYS

United States Patent Office

Re. 28,320
Reissued Jan. 28, 1975

28,320
CLEANING OF THE INTERIOR OF STORAGE TANKS

David J. Baldwin, London, England, by Sybron Corporation, Rochester, N.Y., assignee Original No. 3,625,234, dated Dec. 7, 1971, Ser. No. 58,599, July 27, 1970. Application for reissue Nov. 19, 1972, Ser. No. 310,213
Claims priority, application Great Britain, July 30, 1969, 38,282/69
Int. Cl. B08b *3/02, 9/08*
U.S. Cl. 134—167 R 15 Claims

Matter enclosed in heavy brackets [ ] appears in the original patent but forms no part of this reissue specification; matter printed in italics indicates the additions made by reissue.

ABSTRACT OF THE DISCLOSURE

Device for tank-cleaning apparatus having a flanged mounting extending through and carried by the hatch, closure or top of a tank to be cleaned and an elongated pipe pivotally connected at one end to the flanged mounting inside of the hatch, closure or top and carrying the tank-cleaning apparatus at the other end. The tank-cleaning device is raised up out of the tank and locked into an inoperative storing position or lowered into the tank and locked into an operating position. Raising and lowering is controlled externally of the tank. Cleaning fluid is introduced to the tank-cleaning apparatus through the pivotal connection which communicates with the elongated pipe.

FIELD OF THE INVENTION

This invention concernes the cleaning of the interior of storage tanks and holds of ships and is particularly although not exclusively concerned with cleaning the tanks of what are known as OBO vessels that is to say Oil and Bulk Ore vessels.

BACKGROUND OF THE INVENTION

Tank-cleaning machines are already known which by means of a number of rotating jets of water are used to clean the interior of oil tankers. It is already known to lower such machines through entry ports into oil tanks to clean them, a procedure which is hardly feasible with very large size tanks such as are now used in oil tankers. It is also known to provide tank-cleaning machines as fixtures inside the tank, the machines being so disposed that the whole interior of the tank can be cleaned with an appropriate number of suitably located machines.

Neither of these expedients will serve for the cleaning of the tanks of OBO vessels which have to be quickly cleaned after the discharge of oil or ore on one journey and before the loading of ore or oil for the next journey. Since these bulk cargo vessels are generally of the order of 75,000 tons displacement or greater the size of their tanks makes it quite impractical to effect such cleaning by lowering tank-cleaning machines into the tank.

Again it is not possible to have tank-cleaning machines fixedly mounted inside the tanks because these would interfere with the use of the mechanical grabs used for unloading the bulk cargos of ore. The cleaning of such tanks has thus involved considerable difficulties. It has been proposed to provide tank-cleaning machines which enter the hold space through the sides thereof and in positions remote from the hatches giving access to the holds and so in positions clear of the mechanical grabs. This proposal, however, involves very costly structural alterations in the vessels.

SUMMARY OF THE INVENTION

We have found according to this invention that the various difficulties and disadvantages outlined above can be avoided or at least greatly reduced by mounting tank-cleaning machines in the hatch covers of the vessels and arranging for such machines to be movable into and out of an operative position.

According to the invention, therefore, we provide apparatus for cleaning the interior of a ships hold or tank comprising a mounting adapted to be mounted on the hatch cover of a ship, a tank-cleaning machine connected to said mounting, means which in use of the apparatus permit a flow of liquid to said machine from outside the hold or tank pivot and means permitting said machine to be movable between an inoperative position where it can be housed within said hatch cover and an operative position where it extends into the hold or tank.

In modern bulk cargo vessels it is usual for the holds to be provided with hatch covers which are slidable athwart the vessel between open and closed positions. Such hatch covers are of substantial depth and it is particularly preferred to mount apparatus according to this invention on such hatch covers, the tank cleaning machine being housed within the hatch cover when not in use and being swingable into an operative position extending into the hold or tank.

It is particularly preferred to mount the apparatus on the hatch cover so that the mounting is substantially central of the vessel since in this way the machine itself can be at the end of a long tubular arm housed within the inside of the hatch cover. The long arm will, of course, allow the machine to extend deep into the hold or tank in use.

We may, if desired, provide a winch, or other winding gear having a cable connectable to the tank cleaning machine and operable externally of the hatch cover to permit the machine to be lowered into its operating position or hoisted into its inoperative position housed within the cover.

In order to prevent movement of the apparatus in its stowed position during passage of the ship a latching means may be provided to secure the apparatus in the inoperative position. This is preferably provided by a hook and eye arrangement which may be automatically engageable and manually releasable from above the hatch cover. The provision of such latching means also enables the strain to be taken off the winch cable. The latching means will preferably be disposed between the mounting and the winch.

Preferably, means are also provided for securing the rotatable jets while the machine is in its stowed position to ensure that, when the hatch covers are slid open the jets do not accidentally foul the deck of the ship and become damaged. We prefer to provide a strop which is accessible from the top of the hatch cover and which can be lashed around the jets and tied off by hand on a suitable attachment secured with respect to the hatch cover.

While the machine and its liquid feed pipe can be swingably mounted by any suitable form of pivotal bracket with a flexible pipeline arranged to permit liquid supply to the machine from outside the hold we prefer to provide a swiveling pipe coupling which connects an inlet pipe for liquid to a supporting pipe connected to the machine while permitting said two pipes to be swingable with respect to each other through at least 90°.

We have found that, when the machine is in its operative position while the ship is under way, it is desirable to provide a locking means for locking the machine against movement. If this is not done, the machine tends to swing with movement of the ship and damage to the machine and to the winch cable can result.

Preferably, said locking means is arranged to provide a visible indication from outside the hatch to show when said machine is in its operative position.

Hence, in order to prevent or at least restrict this movement of the machine and also to take the strain off the cable while the machine is in its operative position we prefer to provide a locking means which comprises one or more locking pins extending through said mounting and threadedly engageable therewith, said pins being engageable with stop means connected to or forming part of said machine when the latter is in the operative position.

Thus, it will be apparent that one locking pin only may be provided which is arranged to engage a stop means on said machine which serves to prevent movement of the machine in either direction. Preferably, however, the locking means is equipped with two locking pins engageable in threaded sleeves depending from said mounting, and two stop means provided on said pivot means, one pin and one stop means serving to prevent swinging movement in each direction about said pivot means.

DESCRIPTION OF THE DRAWINGS

In order that the invention may be well understood, a preferred embodiment thereof by way of example only, will be described by reference to the accompanying drawings in which.

DESCRIPTION OF THE INVENTION

Figure 1:
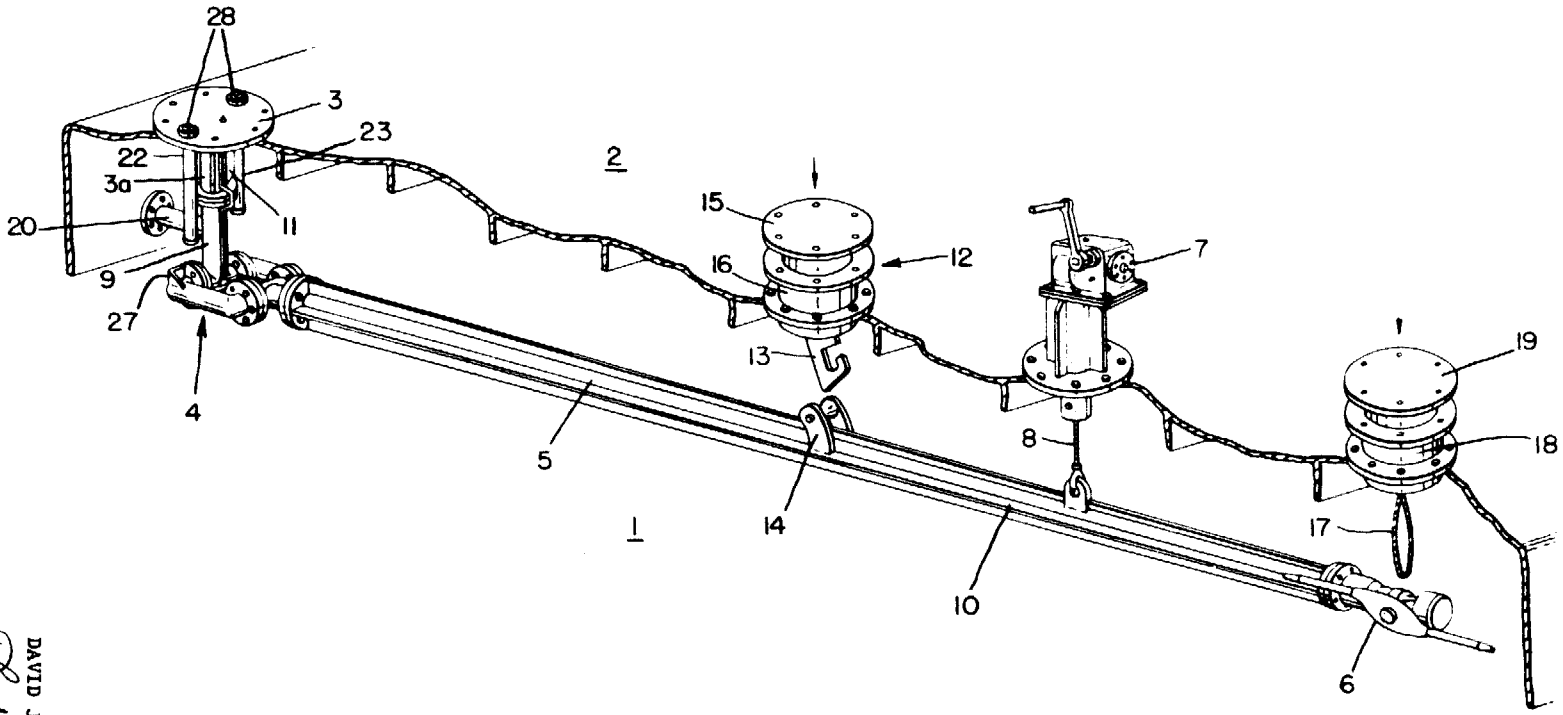
FIG. 1 shows a perspective view, partly in section, of a tank-cleaning machine according to the invention in its inoperative or stowed position in the hatch cover of a ship.

As shown in FIG. 1 the tank 1 of a vessel intended for oil and bulk ore transport is provided with a hatch cover 2 which is slidable athwart the vessel to give access to the hold.

A flanged mounting 3 is secured to the outside of hatch cover 2 and has a pipe 3a which is connected inside the hatch with a pipe 9 which enters a swivel coupling 4. The swivel coupling 4 has an outlet pipe 5 at the end of which a tank-cleaning machine 6 known per se is mounted. The pipes 5 and 3a are each equipped with four radially extending ribs 10 and 11 respectively for strengthening purposes.

On the hatch cover 2, a winch 7 is mounted in a gastight manner and controls a cable 8 connected to outlet pipe 5 so that the machine 6 can be moved into and out of its operative position from outside the hold. The cable 8 is preferably made from terylene in order to reduce the danger of sparks when the winch is being operated.

Figure 2:
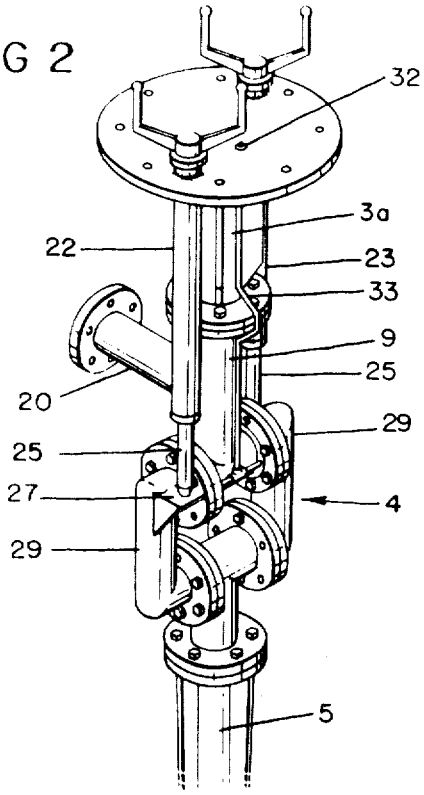
FIG. 2 shows a perspective view of part of FIG. 1 illustrating the apparatus in its operative position.

FIG. 1 shows the machine in its inoperative position housed within the hatch cover 2 while FIG. 2 shows the position of the pipe 5 during operation of the machine. It will be seen that, when in operation the apparatus extends substantially vertically into the hold.

In order to ensure that the machine is securely fixed while in its inoperative position a latching means 12 is provided. This consists of a spring-loaded hook 13 adapted automatically to engage an eye 14 attached to the pipe 5 as the machine is raised into its inoperative position. The hook may be released by hand from above the hatch cover after removing a top plate 15 of a housing 16 which is bolted to the hatch cover. The top plate 15 is normally attached to the housing 16 by means of bolts, the housing and top plate being such as to form a gastight seal when the top plate is in place. The hook 13 is pivoted on a plate (not shown) attached within the housing 16 in such a manner that the hook is enclosed within the housing when the cover 15 is in place.

When the hatch cover 2 is slid open, it must be ensured that the rotatable nozzles of the cleaning machine 6 do not foul the deck of the ship or damage to the nozzles may result. In order to prevent this, a strop 17 is provided which can be tied in any desired manner around the nozzles and the end of pipe 5 in order to secure the nozzles in a position as shown. As before, a housing 18 and top plate 19 are provided, the strop 17 being tied off on some suitable cleat or the like within the housing 18. In this way the strop may be tied and untied by hand by means of access through the housing 18 when its top plate is removed. Again a gastight seal must be ensured between hatch 2, housing 18 and plate 19.

Figure 3:
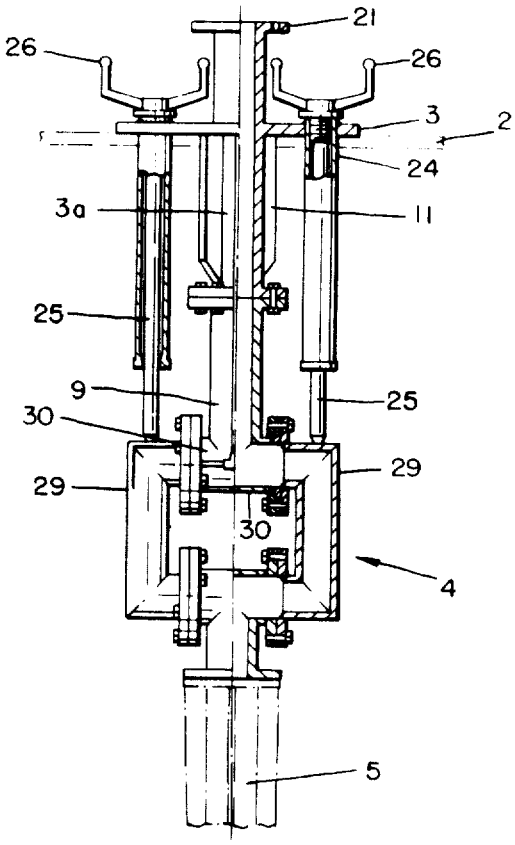
FIG. 3 shows a part sectional side elevation of the apparatus in the operative position, such apparatus being modified to permit water to be supplied from above the hatch cover and, FIG. 4 shows an enlarged sectional side elevation of part of the swivel coupling employed in this apparatus.

The water supply to the machine when operating can be provided from the side of the hold via a pipe 20, swivel coupling 4 and pipe 5 to the cleaning machine 6. Alternatively, as shown in FIG. 3, the water may be supplied from above the hatch cover. In this case the pipe 3a is extended above flange mounting 3 and terminates in a flange 21, the pipe 20 being omitted.

In order to prevent swinging movement of the cleaning apparatus when in use, i.e., when the pipe 5 is in the vertical position as shown in FIG. 2, two locking devices 22 and 23 are provided. As shown in FIG. 3, these each comprise a cylindrical casing 24 which is fixed to the flange mounting 3 and provided near the top thereof with an internal thread. At the commencement of operation of the apparatus, a rod 25 is inserted into casing 24. The rod is provided with a thread at its upper end which cooperates with the thread in the casing 24, the length of the rod being such that after it has been inserted into casing 24 and the two threads have been engaged, the lower end of each rod is immediately above one of two ledges 27 provided on the swivel coupling 4. One of these ledges is shown in FIG. 2; the other, which is hidden from view is in the same position on the diagonally opposite side of the coupling 4. When the threads meet, the rods 25 are rotated by means of handles 26 to engage the threads and cause the lower ends of the rods to bear upon the ledges 27. Hence, the locking pin 22 and its associated ledge prevent movement of the apparatus in a direction towards its stowed position while the locking pin 23 and its associate ledge prevent movement in the opposite direction.

When the apparatus is required to be moved from its operating position to its stowed position the rods 25 are first unscrewed and removed, and then threaded plugs 28 are screwed into the casings 24 to ensure a gastight seal (see FIG. 1). Hence, inspection of the top of the flange mounting 3 will enable the position of the cleaning apparatus, i.e., stowed or in use, to be ascertained depending upon whether the handles 26 or the plugs 28 are inserted into the mounting 3.

Figure 4:
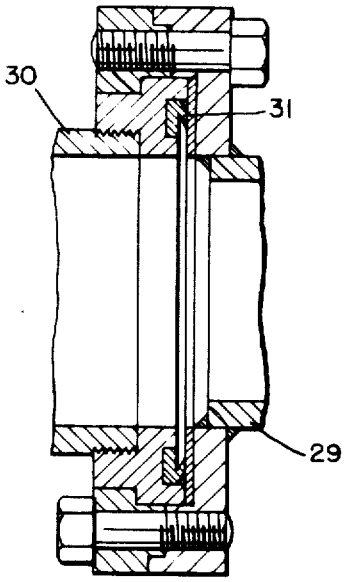

While various swivel or rotary couplings may be used, we prefer to use a coupling as shown in detail in FIGS. 3 and 4 wherein the inlet pipe 9 from the water supply terminates in two branch pipe stubs 30 which extend oppositely to each other and at right angles to the inlet pipe. Each such pipe stub has one arm of a U-shaped connector 29 rotatably mounted thereon in a liquidtight manner. The other end of each U-connector is welded to one of two pipe stubs connected at right angles to pipe 5 at the other end of which the tank-cleaning machine 6 is mounted.

FIG. 4 shows an enlarged section through one of the rotatable couplings between one branch pipe stub 30 and its associated U-shaped connector 29. As can be seen from this Figure an annular seal 31 is provided to ensure that the joint between the pipe stubs 30 and connectors 29 is watertight while allowing pipe 5 and two U-shaped connectors 29 to be pivotally movable about the axis of seal ring 31 and the pipe stubs 30. The seals 31 are preferably made from P.T.F.E.

Provision is made for greasing the rotatable coupling from above the deck by means of a grease nipple 32 on the flange mounting 3 which is connected to a small bore pipe 33. Pipe 33 divides into two paths, one feeding each rotatable coupling.

We have found that such a swivel coupling enables water at high pressure to be delivered to the cleaning machine while at the same time enabling the machine to be swung into and out of position.

We have found that by means of apparatus according to the invention OBO vessels or large tankers or bulk carriers can be readily cleaned by machines disposed in the appropriately placed hatch covers and a system embodying such apparatus is especially well suited for automated and remote control operation which is frequently desirable in modern large tonnage vessels which operate with very small crews.

Although this invention is particularly suited for use on vessels such as OBO vessels and the like and for ease of description has been described herein in such capacity, it will be understood that the invention is suitable for use in the cleaning of tanks in general such as for example, oil storage tanks and the like and the description of the invention should not be construed as limiting the invention to use on vessels. It should also be understood that in its preferred embodiment the device of this invention is carried by and stored within a hatch cover. However, the device of this invention is equally useful when carried by the top wall of the tank rather than by its closure or hatch and the term top includes the top wall and hatch or closure of the tank.

We claim:

1. Apparatus for cleaning the interior of a tank comprising a mounting adapted to be carried by the top of said tank and extending therein, a tank-cleaning machine connected to said mounting, means for introducing a flow of liquid to said machine from outside said tank and pivot means including a rotary pipe coupling permitting said machine to be movable between an inoperative position where it can be housed within said tank and an operative position where it extends into the tank.

2. Apparatus according to claim 1 in which a winch or other winding gear is provided to raise and lower said tank-cleaning machine between its operative and inoperative positions.

3. Apparatus according to claim 2 wherein said winding gear comprises a winch adapted to be mounted in a gastight manner on said tank for operation from the exterior of said tank to raise and lower a cable which is attached to said tank-cleaning machine.

4. Apparatus according to claim 1 in which a latching means is provided to securely hold said tank-cleaning machine while in its inoperative position within the tank, said latching means comprising a hook and eye arrangement which is operable from the exterior of said tank.

5. Apparatus according to claim 4 in which said eye is attached to said tank-cleaning machine and said hook is pivotally attachable with respect to the top of said tank and spring loaded in such a manner that said hook automatically engages said eye as said tank-cleaning machine is raised into its inoperative position.

6. Apparatus according to claim 4 in which said hook is housed within a housing adapted to be carried by the top of said tank in a gastight manner, said housing having a cover plate attached thereto in a gastight manner, which cover plate is removable for manual release of the hook.

7. Apparatus of claim 1 further including a locking means for locking the machine against movement while in its operative position.

8. Apparatus as claimed in claim 7 wherein said locking means are arranged to provide a visible indication from outside said tank to show when said machine is in its operative position.

9. Apparatus as claimed in claim 7 wherein said locking means comprises one or more locking pins extending through said mounting and threadedly engageable therewith said pins being engageable with stop means connected to or forming part of said machine when the latter is in the operative position

10. Apparatus as claimed in claim 7 including two locking pins engageable in threaded sleeves depending from said mounting, and two stops means provided on said pivot means, one pin and one stop serving to prevent swinging movement in each direction about said pivot means.

11. Apparatus of claim 1 wherein said tank-cleaning machine is of the type which includes rotatable nozzles arranged in use to direct jets of water at the surfaces to be cleaned.

12. Apparatus as claimed in claim 11, in which locking means are provided to secure said nozzles against movement when the machine is in its inoperative position.

13. Apparatus as claimed in claim 12 in which said locking means comprises a strop provided in a casing mountable on the top of said tank and is accessible through a cover arranged to make a gastight seal.

14. Apparatus according to claim 1 in which said coupling comprises an inlet pipe which terminates in two branch pipe stubs extending oppositely to each other and at right angles to the inlet pipe, two U-shaped connectors one arm of each of which is rotatably connected to one of said branch pipe stubs in a liquidtight manner and the other arm of each of which is attached to one of two further pipe stubs connected to an outlet pipe which is connected to said tank-cleaning machine.

15. Apparatus as claimed in claim 14 wherein each of the rotatable connections between the branch pipe stubs and the U-shaped connectors is sealed by means of an annular seal.

References Cited

The following references, cited by the Examiner, are of record in the patented file of this patent or the original patent.

UNITED STATES PATENTS

| | | | |
|---|---|---|---|
| 1,545,896 | 7/1925 | Hanlon | 134—167 R |
| 1,693,885 | 12/1928 | Butterworth | 134—168 R |
| 2,185,567 | 1/1940 | Qviller | 134—167 R X |
| 3,150,669 | 9/1964 | Green, Jr. | 134—167 R |
| 3,444,869 | 5/1969 | Guignon et al. | 134—167 R |

FOREIGN PATENTS

| | | | |
|---|---|---|---|
| 514,256 | 2/1955 | Italy | 239—227 |

ROBERT L. BLEUTGE, Primary Examiner

U.S. Cl. X.R.

239—227